United States Patent
Lewis

(10) Patent No.: US 11,154,922 B1
(45) Date of Patent: Oct. 26, 2021

(54) SWAGE MACHINE DIE RETAINER SYSTEMS AND METHODS

(71) Applicant: Trinity Bay Equipment Holdings, LLC, Houston, TX (US)

(72) Inventor: Mikel Lee Lewis, Baytown, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 17/114,610

(22) Filed: Dec. 8, 2020

(51) Int. Cl.
  *B21D 37/10* (2006.01)
  *B21D 39/04* (2006.01)
  *B21J 9/06* (2006.01)
  *B21J 13/04* (2006.01)

(52) U.S. Cl.
  CPC ........... *B21D 37/10* (2013.01); *B21D 39/046* (2013.01); *B21J 9/06* (2013.01); *B21J 13/04* (2013.01)

(58) Field of Classification Search
  CPC .......................... B21D 39/046; B21C 37/154
  USPC ........................................................... 29/508
  See application file for complete search history.

(56) References Cited

U.S. PATENT DOCUMENTS

| 4,285,228 A * | 8/1981 | Gunning | B21D 39/046 29/237 |
| 8,631,553 B2 * | 1/2014 | Gleim | B21D 39/04 29/508 |

FOREIGN PATENT DOCUMENTS

CA  2443297 A1 *  5/1998  ......... F16L 33/2076

* cited by examiner

*Primary Examiner* — Shelley M Self
*Assistant Examiner* — Smith Oberto Bapthelus
(74) *Attorney, Agent, or Firm* — Conrad J. Hsu

(57) ABSTRACT

Techniques for implementing and/or operating a system that includes a pipe fitting to be secured to a pipe segment and a swage machine. The pipe fitting includes a fitting jacket to be conformally deformed around tubing of the pipe segment. The swage machine includes a grab plate that interlocks with the pipe fitting, a die plate, in which a die is to be loaded in the die plate, a swaging actuator secured to the die plate, in which the swaging actuator facilitates conformally deforming the fitting jacket around the tubing of the pipe segment by causing the die plate and the grab plate of the swage machine to move toward one another, and a die retainer actuator secured to the grab plate of the swage machine, in which the die retainer actuator extends through the grab plate toward the die plate and pushes against the die.

9 Claims, 6 Drawing Sheets

SWAGE MACHINE DIE RETAINER SYSTEMS AND METHODS

BACKGROUND

The present disclosure generally relates to pipeline systems and, more particularly, to special-purpose deployment equipment—namely a swage machine—that may be implemented and/or operated to facilitate securing a pipe fitting to one or more pipe segments deployed or to be deployed in a pipeline system.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments in addition to one or more pipe (e.g., midline and/or end) fittings (e.g., connectors), for example, which are used to fluidly couple a pipe segment to another pipe segment, to a fluid source, and/or to a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid.

Additionally, in some instances, a pipe fitting may be implemented to be secured to a pipe segment via swaging techniques, which conformally deform a portion of the pipe fitting around the tubing of the pipe segment such that the portion of the pipe fitting engages the pipe segment tubing. In fact, in some such instances, special-purpose deployment equipment—namely a swage machine—may be implemented and/or operated to facilitate swaging (e.g., conformally deforming) the portion of the pipe fitting around the pipe segment tubing. In particular, the swage machine may include a grab plate, which is implemented to matingly interlock with a grab ring on the pipe fitting to facilitate securing the swage machine to the pipe fitting, and a die plate, which is implemented to enable a set of one or more dies to be loaded therein such that the shape of the set of one or more dies facilitates conformally deforming the portion of the pipe fitting inwardly in a radial direction when passed thereover in an axial direction. However, at least in some such instances, the position of a die in a swage machine may shift after it has been loaded in the die plate of the swage machine, thereby potentially affecting (e.g., reducing) quality (e.g., uniformity) of a resulting swage and, thus, security and/or sealing provided by the swage.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a system includes a pipe fitting to be secured to a pipe segment and a swage machine. The pipe fitting includes a fitting jacket to be conformally deformed around tubing of the pipe segment that defines a pipe bore and a fluid conduit implemented in a tubing annulus of the tubing to facilitate securing the pipe fitting to the pipe segment. The swage machine includes a grab plate that matingly interlock with the pipe fitting to facilitate securing the swage machine to the pipe fitting, a die plate, in which a set of one or more dies is to be loaded in the die plate of the swage machine, a swaging actuator secured to the die plate of the swage machine, in which the swaging actuator facilitates conformally deforming the fitting jacket of the pipe fitting around the tubing of the pipe segment at least in part by causing the die plate and the grab plate of the swage machine to move toward one another, and a die retainer actuator secured to the grab plate of the swage machine, in which the die retainer actuator extends through the grab plate toward the die plate and pushes against a die loaded in the die plate to facilitate securing the die at a target position in the die plate.

In another embodiment, a method of implementing a swage machine includes implementing a grab plate with a grab tab that matingly interlocks with a grab notch on a grab ring of pipe fitting to be swaged by the swage machine to facilitate securing the swage machine to the pipe fitting, implementing a die plate to enable a set of one or more dies to be used to swage the pipe fitting to be loaded therein, securing a swaging actuator to the die plate of the swage machine to enable the swage machine to swage the pipe fitting at least in part by operating the swaging actuator to cause the die plate and the grab plate of the swage machine to move toward one another, and securing a die retainer actuator to the grab plate of the swage machine such that the die retainer actuator extends through the grab plate toward the die plate of the swage machine to enable the die retainer actuator to engage a die loaded in the die plate in an axial direction to facilitate maintaining the die at a target position in the die plate.

In another embodiment, a swage machine includes a swaging actuator secured to a die plate of the swage machine and a die retainer actuator. The swaging actuator includes a first actuator cylinder and a first actuator piston and the swage machine swages a pipe fitting that is secured to a grab plate of the swage machine at least in part by operating the swaging actuator to cause the die plate and the grab plate of the swage machine to move toward one another. The die retainer actuator includes a second actuator cylinder that is secured to the grab plate of the swage machine, a relief valve fluidly coupled to the second actuator cylinder of the die retainer actuator, and a second actuator piston that extends through grab plate in an axial direction toward the die plate of the swage machine to enable the second actuator piston of the die retainer actuator to directly abut a die loaded in the die plate to facilitate maintaining the die at a target position in the die plate.

DETAILED DESCRIPTION

Figure 1:
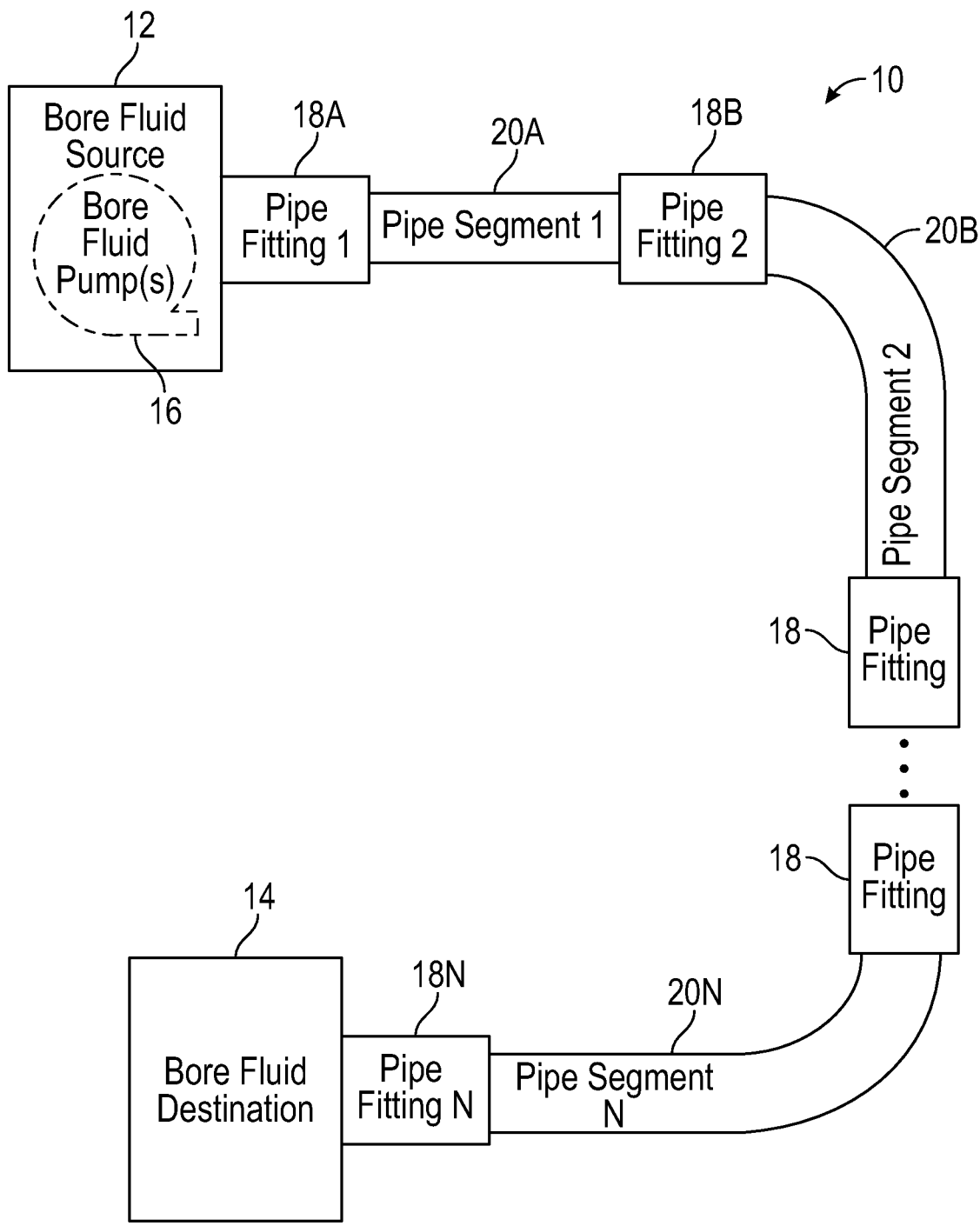
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments, which each includes tubing that defines (e.g., encloses) a corresponding pipe bore. More specifically, a pipe segment may generally be secured and sealed in one or more pipe fittings to facilitate fluidly coupling the pipe segment to another pipe segment, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, to enable fluid flow therethrough, a pipe fitting generally includes a fitting bore, which is defined (e.g., enclosed) by a fitting tube. Additionally, in some instances, the pipe fitting may be secured to a pipe segment at least in part by securing the tubing of the pipe segment around the fitting tube of the pipe fitting using swaging techniques. To facilitate securing a pipe segment thereto via swaging techniques, the pipe fitting may include one or more fitting jackets implemented circumferentially around its fitting tube. When implemented in this manner, the pipe fitting may be secured to the pipe fitting via swaging techniques at least in part by disposing (e.g., inserting) the tubing of the pipe segment in a tubing cavity of the pipe fitting, which is defined (e.g., enclosed) between a corresponding fitting jacket and the fitting tube, and conformally deforming the fitting jacket around the pipe segment tubing such that an inner surface of the fitting jacket and/or an outer surface of the fitting tube engage corresponding surfaces of the pipe segment tubing.

In fact, in some instances, special-purpose deployment equipment—namely a swage machine—may be implemented and/or operated to facilitate conformally deforming a fitting jacket of a pipe fitting around the tubing of a pipe segment. In particular, to facilitate conformally deforming a fitting jacket of a pipe fitting around pipe segment tubing, the swage machine may include a grab plate and a die plate, for example, in addition to a support plate. More specifically, the grab plate of the swage machine may include grab tab, which is implemented (e.g., sized and/or shaped) to matingly interlock (e.g., engage and/or interface) with a grab notch implemented on a grab ring of the pipe fitting to facilitate securing the swage machine to the pipe fitting. Additionally, the die plate of the swage machine may be implemented to enable a set of one or more dies to be loaded therein such that the set of one or more dies deforms a fitting jacket of the pipe fitting inwardly in a radial direction when the set of one or more dies is passed over the fitting jacket in an axial direction.

To facilitate moving a portion of a swage machine in an axial direction, the swage machine may additionally include one or more swaging actuators secured to its die plate. In particular, each swaging actuator of a swage machine may include an actuator cylinder and an actuator piston, which selectively extends out from the actuator cylinder based at least in part on the supply of fluid (e.g., liquid and/or gas) to the actuator cylinder and/or selectively retracts into the actuator cylinder based at least in part on the extraction of fluid out from the actuator cylinder. For example, in some instances, a swaging actuator may be secured in a swage machine such that its actuator cylinder is secured to the die plate of the swage machine and its actuator piston extends through the die plate and is secured to the grab plate of the swage machine or vice versa, thereby enabling the swage machine to pull the grab plate toward the die plate such that a fitting jacket of a pipe fitting secured to the grab plate passes through a set of one or more dies loaded in the die plate via one or more reverse (e.g., retracting) strokes of the swaging actuator. In other instances, a swaging actuator may be secured in a swage machine such that its actuator cylinder is secured to a support plate of the swage machine and its actuator piston is secured to the die plate of the swage machine, thereby enabling the swage machine to push the die plate toward the grab plate of the swage machine such that a set of one or more dies loaded in the die plate passes over a fitting jacket of a pipe fitting that is secured to the grab plate via one or more forward (e.g., extending) strokes of the swaging actuator.

In any case, in some instances, different sets of dies may be used to swage pipe fittings. For example, a first set of one or more dies, which have a larger inner surface diameter, may be used to swage a fitting jacket of a pipe fitting during a first swaging pass while a second set of one or more dies, which have a smaller inner surface diameter, may be used to swage the fitting jacket during a second swaging pass after the first swaging pass. As such, to facilitate improving swaging efficiency, the die plate of a swage machine may be implemented to enable different sets of dies to be selectively loaded therein, for example, at different times. However, at least in some instances, the position of a die in swage machine may shift even after being loaded in its die plate, thereby potentially affecting (e.g., reducing) quality (e.g., uniformity) of a resulting swage and, thus, security and/or sealing provided by the swage.

Accordingly, to facilitate improving swage quality, the present disclosure provides techniques for implementing and/or operating special-purpose deployment equipment—namely a swage machine—to facilitate securing a die in its die plate, for example, at least in part by reducing movement of the die in the die plate while the die is being used by the swage machine to perform a swaging operation. To facilitate securing (e.g., maintaining) a die at its target (e.g., desired) position in the die plate of a swage machine, as will be described in more detail below, the swage machine may include one or more die retainer actuators in addition to its one or more swaging actuators. Similar to a swaging actuator, each die retainer actuator of the swage machine may include an actuator cylinder and an actuator piston, which selectively extends out from the actuator cylinder based at least in part on the supply of fluid (e.g., liquid and/or gas) to the actuator cylinder and/or selectively retracts into the actuator cylinder based at least in part on the extraction of fluid out from the actuator cylinder. In particular, in some embodiments, one or more die retainer actuators in a swage machine may each be a fluid actuator, such as a hydraulic actuator or a pneumatic actuator.

However, the actuator cylinder of a die retainer actuator in a swage machine may be secured to the grab plate of the swage machine instead of the die plate of the swage machine. Additionally, the actuator piston of the die retainer actuator may extend through the grab plate of the swage machine in an axial direction toward the die plate of the swage machine. As such, to facilitate securing a die in the die plate, the die retainer actuator may be operated to extend its actuator piston out from its actuator cylinder such that the actuator piston engages (e.g., pushes against and/or directly abuts) the die in an axial direction, for example, at least in part by enabling fluid to be supplied to the actuator cylinder of the die retainer actuator until a target (e.g., desired) fluid pressure associated with the die retainer actuator is reached.

As described above, a swage machine may swage (e.g., conformally deform) a fitting jacket of a pipe fitting secured to its grab plate around the tubing of a pipe segment that is disposed in the pipe fitting at least in part by operating one or more of its swaging actuators to cause its grab plate and its die plate to move toward one another. For example, when an actuator cylinder of a swaging actuator is secured to the die plate and the actuator piston of the swaging actuator extends through the die plate and is secured to the grab plate or vice versa, the swaging actuator may be operated to facilitate pulling the grab plate toward the die plate via one or more reverse (e.g., retract) strokes, for example, at least in part by enabling fluid to be extracted from the actuator cylinder of the swaging actuator. Alternatively, when a swaging actuator is secured between the die plate and a support plate of the swage machine such that the support plate is disposed between the die plate and the grab plate, the swaging actuator may be operated to facilitate pushing the die plate toward grab plate via one or more forward (e.g., extending) strokes, for example, at least in part by supplying fluid to the actuator cylinder of the swaging actuator. However, as described above, the actuator cylinder of a die retainer actuator in the swage machine may be secured to its grab plate and the actuator piston of the die retainer actuator may extend out from the actuator cylinder toward its die plate to engage and, thus, facilitate securing a die loaded in the die plate at its target (e.g., desired) position.

To enable moving the die plate and the grab plate of a swage machine toward one another while maintaining a die at its target position in the die plate, a die retainer actuator of the swage machine may include a relief (e.g., fluid) valve fluidly coupled to its actuator cylinder. In particular, in some embodiments, the relief valve of the die retainer actuator may be implemented to retain fluid in the actuator cylinder of the die retainer actuator when fluid pressure within the actuator cylinder is less than or equal to a threshold fluid pressure associated with the relief value and begin to release fluid from the actuator cylinder when the fluid pressure within the actuator cylinder exceeds (e.g., is greater than) the threshold fluid pressure. Additionally, in some embodiments, a target (e.g., desired) fluid pressure associated with a die retainer actuator may be set less than or equal to the threshold fluid pressure associated with the relief value of the die retainer actuator, for example, to enable the target fluid pressure to be reached without having to continuously supply fluid to the die retainer actuator. Thus, when the swage machine is operated to perform a swaging operation at least in part by moving its die plate and its grab plate toward one another, in such embodiments, the die retainer actuator may continue exerting at least the force, which results from an associated target fluid pressure being present in its actuator cylinder, in an axial direction against a corresponding die loaded in the die plate and, thus, facilitate securing the die in the die plate while the swage machine is performing the swaging operation, for example, passively without continuously supplying fluid to the die retainer actuator after an associated target fluid pressure is initially reached. In this manner, as will be described in more detail below, implementing and/or operating a swage machine in accordance with the techniques described in the present disclosure may facilitate maintaining a die loaded in the die plate of the swage machine at its target (e.g., desired) position in the die plate, which, at least in some instances, may facilitate improving quality (e.g., uniformity) of a resulting swage and, thus, security and/or sealing provided by the swage in a pipeline system.

To help illustrate, an example of a pipeline system 10 is shown in FIG. 1. As depicted, the pipeline system 10 is coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., one or two) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
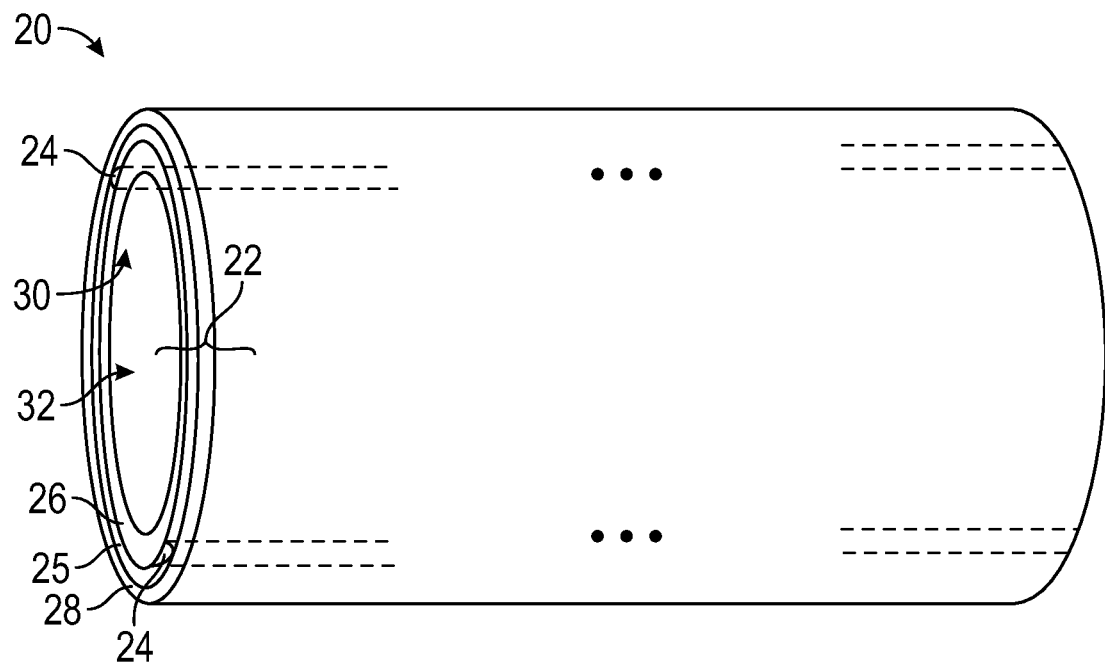
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in a tubing annulus 25, is shown in FIG. 2. As depicted, the pipe segment tubing 22 is implemented with multiple layers including an inner (e.g., innermost) layer 26 and an outer (e.g., outermost) layer 28. In some embodiments, the inner layer 26 and/or the outer layer 28 of the pipe segment tubing 22 may be implemented using composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner layer 26 and its outer layer 28. As will be described in more detail below, the tubing annulus 25 may include one or more intermediate (e.g., reinforcement) layers of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, as compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally, in other embodiments, a fluid conduit 24 defined in a tubing annulus 25 of a pipe segment 20 may run non-parallel to the pipe bore 32 of the pipe segment 20, for example, such that the fluid conduit 24 is skewed relative to the axial (e.g., longitudinal) extent of the pipe bore 32.

Figure 3:
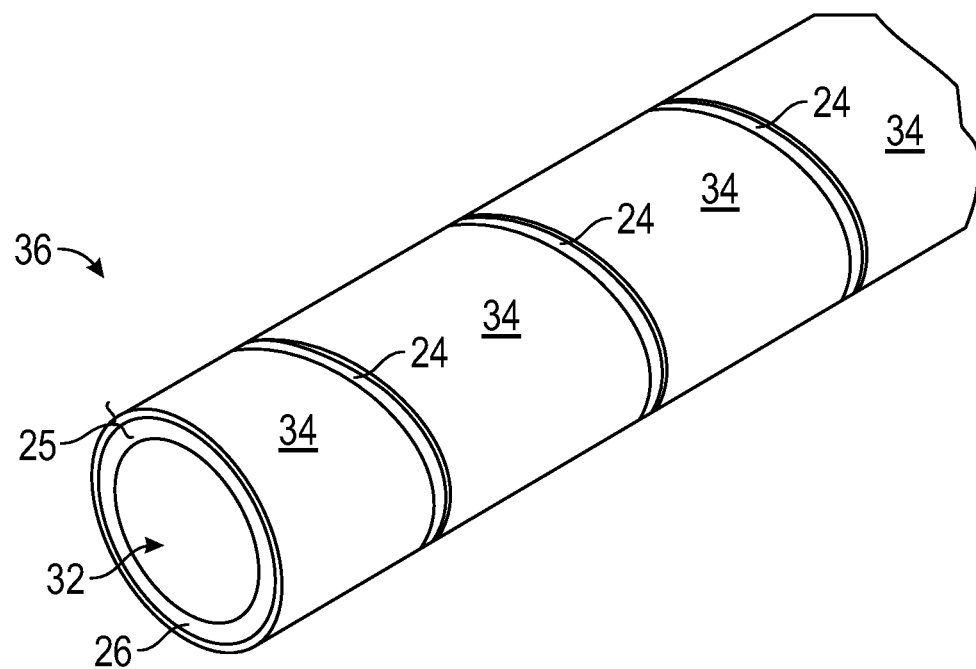
FIG. 3 is a perspective view of an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner layer 26 and an intermediate (e.g., reinforcement) layer 34 included in a tubing annulus 25 of its pipe segment tubing 22, is shown in FIG. 3. In some embodiments, one or more intermediate layers 34 of the pipe segment tubing 22 may be implemented using composite material and/or metal, such as carbon steel, stainless steel, duplex stainless steel, super duplex stainless steel, or any combination thereof. In other words, at least in some such embodiments, an intermediate layer 34 of the pipe segment tubing 22 may be implemented using electrically conductive, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner layer 26 such that gaps (e.g., openings) are left between adjacent windings to define a fluid conduit 24. In other words, in some embodiments, the intermediate layer 34 may be implemented at least in part by winding a solid strip of material around the inner layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer layer 28 may be disposed over the third other intermediate layer 34 and, thus, cover (e.g., define and/or enclose) the other fluid conduit 24 in the third other intermediate layer 34.

In any case, to facilitate flowing fluid from a bore fluid source 12 to a bore fluid destination 14, as described above, one or more pipe fittings 18, such as a midline pipe fitting 18 and/or a pipe end fitting 18, may be secured to a pipe segment 20. In particular, as described above, in some instances, a pipe fitting 18 may be secured to a pipe segment 20 using swaging techniques, which conformally deform a fitting jacket of the pipe fitting 18 around tubing 22 of the pipe segment 20. In fact, in some embodiments, special-purpose deployment equipment—namely a swage machine—may be implemented and/or operated to facilitate securing a pipe fitting 18 to a pipe segment 20 during deployment of a pipeline system 10.

Figure 4:
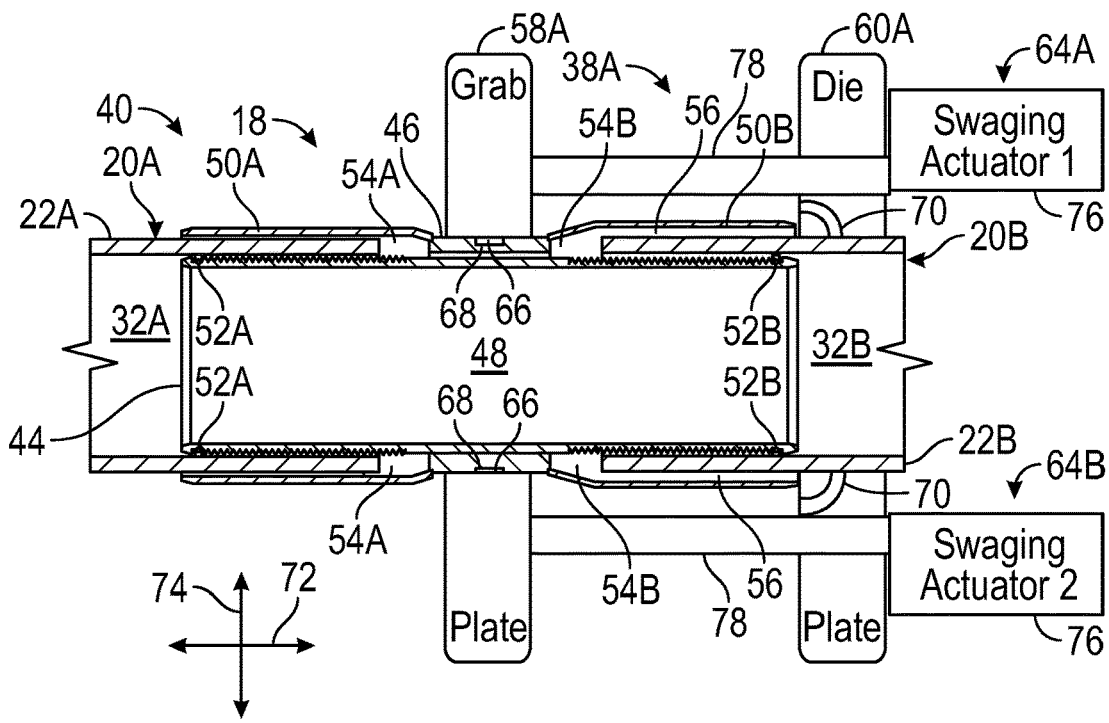
FIG. 4 is an axial cross-section profile of an example of a portion of the pipeline system of FIG. 1 and a swage machine, in accordance with an embodiment of the present disclosure.

To help illustrate, an example cross-section of a swage machine 38A and a portion 40 of a pipeline system 10 is shown in FIG. 4. As depicted, the portion 40 of the pipeline system 10 includes a first pipe segment 20A, a second pipe segment 20B, and a pipe fitting 18, which is coupled between the first pipe segment 20A and the second pipe segment 20B. Additionally, as depicted, the pipe fitting 18 includes a fitting tube 44 and a grab ring 46, which is implemented around the fitting tube 44. In particular, as depicted, the fitting tube 44 defines (e.g., encloses) a fitting bore 48, which is fluidly coupled to a first pipe bore 32A of the first pipe segment 20A and a second pipe bore 32B of the second pipe segment 20B.

In other words, the pipe fitting 18 in FIG. 4 may be a midline pipe fitting 18. However, it should be appreciated that the depicted example is merely intended to be illustrative and not limiting. In particular, in other embodiments, the techniques described in the present disclosure may additionally or alternatively be used with other types of pipe fittings 18, such as a pipe end fitting 18.

In any case, as depicted, the pipe fitting 18 includes fitting jackets 50—namely a first fitting jacket 50A and a second fitting jacket 50B—and fitting seals 52—namely a first fitting seal 52A and a second fitting seal 52B—implemented circumferentially around the fitting tube 44. In particular, as depicted, first tubing 22A of the first pipe segment 20A is disposed in a first tubing cavity 54A of the pipe fitting 18, which is defined between the first fitting jacket 50A and the fitting tube 44. Similarly, second tubing 22B of the second pipe segment 20B is disposed in a second tubing cavity 54B of the pipe fitting 18, which is defined between the second fitting jacket 50B and the fitting tube 44.

However, as depicted, open space 56 is present between the second tubing 22B of the second pipe segment 20B and the second fitting jacket 50B of the pipe fitting 18 whereas minimal open space is present between the first tubing 22A of the first pipe segment 20A and the first fitting jacket 50A of the pipe fitting 18. As such, the pipe fitting 18 may exert more resistance to tubing movement in the first tubing cavity 54A and, thus, facilitate securing the pipe fitting 18 to the first pipe segment 20A, for example, in addition to sealing the first tubing 22A of the first pipe segment 20A via the first fitting seal 52A. On the other hand, the pipe fitting 18 may exert less resistance to tubing movement in the second tubing cavity 54B, which, at least in some instances, may enable the second tubing 22B of the second pipe segment 20B to move relatively freely into and/or out from the second tubing cavity 54B of the pipe fitting 18. As such, to facilitate securing the pipe fitting 18 to the second pipe segment 20B and sealing the second tubing 22B of the second pipe segment 20B in pipe fitting 18 via the second fitting seal 52B, the swage machine 38 may be operated to conformally deform (e.g., swage) the second fitting jacket 50B around the second tubing 22B of the second pipe segment 20B, thereby consuming at least a portion (e.g., majority) of the open space 56.

To facilitate conformally deforming a fitting jacket 50 around pipe segment tubing 22, as depicted, the swage machine 38A includes a grab plate 58A and a die plate 60A. In particular, as depicted, the grab plate 58A of the swage machine 38A includes a grab tab 66, which is implemented (e.g., sized and/or shaped) to matingly interlock (e.g., engage and/or interface) with a grab notch 68 on the grab ring 46 of the pipe fitting 18. In other words, the grab plate 58A may be implemented to facilitate securing the first fitting jacket 50A to the pipe fitting 18.

Additionally, as depicted, the die plate 60A of the swage machine 38A is implemented to enable a set of one or more dies (e.g., die segments) 70 to be loaded therein. In particular, as depicted, the set of one or more dies 70 is loaded into the die plate 60A such that the set of one or more dies 70 opens toward the grab plate 58A of the swage machine 38A. As such, when compressed against a fitting jacket 50 of the pipe fitting 18 in an axial direction 72 toward the grab plate 58A, the shape of the set of one or more dies 70 may compress the fitting jacket 50 inwardly in a radial direction 74, for example, such that the fitting jacket 50 and pipe segment tubing 22 disposed in a corresponding tubing cavity 54 are conformally deformed. In fact, in some embodiments, a die plate 60 of a swage machine 38 may be implemented to enable different sets of one or more dies 70 to be selectively loaded therein, for example, during successive swaging passes (e.g., cycles) and/or depending on characteristics, such as diameter and/or material thickness, of the fitting jacket 50.

To facilitate compressing a set of one or more dies 70 loaded in its die plate 60 against a fitting jacket 50 in an axial direction 72, as in the depicted example, a swage machine 38 may include one or more swaging actuators 64. In particular, in the depicted example, the swage machine 38A include a first swaging actuator 64A and a second swaging actuator 64B. In some embodiments, one or more swaging actuators 64 of a swage machine 38 may each be a fluid actuator, such as a hydraulic actuator or a pneumatic actuator. In any case, as depicted, each swaging actuator 64 of the swage machine 38A includes an actuator cylinder 76 and an actuator piston 78, which selectively extends out from the actuator cylinder 76 based at least in part on the supply of fluid (e.g., liquid and/or gas) to the actuator cylinder 76 and/or selectively retracts into the actuator cylinder 76 based at least in part on the extraction of fluid from the actuator cylinder 76.

In particular, in the depicted example, the actuator cylinder 76 of each swaging actuator 64 is secured to the die plate 60A of the swage machine 38A. Additionally, in the depicted example, the actuator piston 78 of each swaging actuator 64 extends through the die plate 60A and is secured to the grab plate 58A of the swage machine 38A. As such, to facilitate performing a swaging operation, the swage machine 38A may operate one or more of its swaging actuators 64 to pull the grab plate 58A toward the die 60A via one or more reverse (e.g., retracting) strokes such that the second fitting jacket 50B of the pipe fitting 18 that is secured to the grab plate 58A moves through the set of one or more dies 70 loaded in the die plate 60A. On the other hand, the swage machine 38A may operate one or more of its swaging actuators 64 to push the grab plate 58A away from the die 60A via one or more forward (e.g., extending) strokes, for example, to facilitate loading a set of one or more dies 70 in the die plate 60A and/or resetting position of the die plate 60A for the performance of a subsequent swaging operation. In this manner, a swage machine 38 may be implemented and/or operated to facilitate swaging (e.g., conformally deforming) a fitting jacket 50 of a pipe fitting 18 around tubing 22 of a pipe segment such that the pipe segment tubing 22 is secured and sealed in the pipe fitting 18.

However, after being loaded in a die plate 60 of a swage machine 38, at least in some instances, the position of a die 70 may nevertheless shift from its target (e.g., desired) position in the die plate 60, for example, due to gravity, the surface of the die plate 60 that contacts the die 70 being slanted, the surface of the die 70 that contacts the die plate 60 being slanted, force the portion 40 of the pipeline system 10 exerts on the die 70, or any combination thereof. As described above, due to its shape, a die 70 loaded in a die plate 60 of a swage machine 38 may facilitate swaging a pipe fitting 18 when the die plate 60 and, thus, the die 70 is passed over a fitting jacket 50 of the pipe fitting 18. However, when the position of a die 70 in a die plate 60 deviates from its target position, the shape of the portion of the die 70 that actually contacts the fitting jacket 50 of the pipe fitting 18 may deviate from the shape that results when the die 70 is at its target position in the die plate 60, which, at least in some instances, may affect (e.g., reduce) the quality (e.g., uniformity) of a resulting swage and, thus, security and/or sealing provided by the swage. As such, to facilitate improving swage quality, the present disclosure provides techniques for implementing and/or operating a swage machine 38 that includes one or more die retainer actuators in addition to one or more swaging actuators 64.

Figure 5:
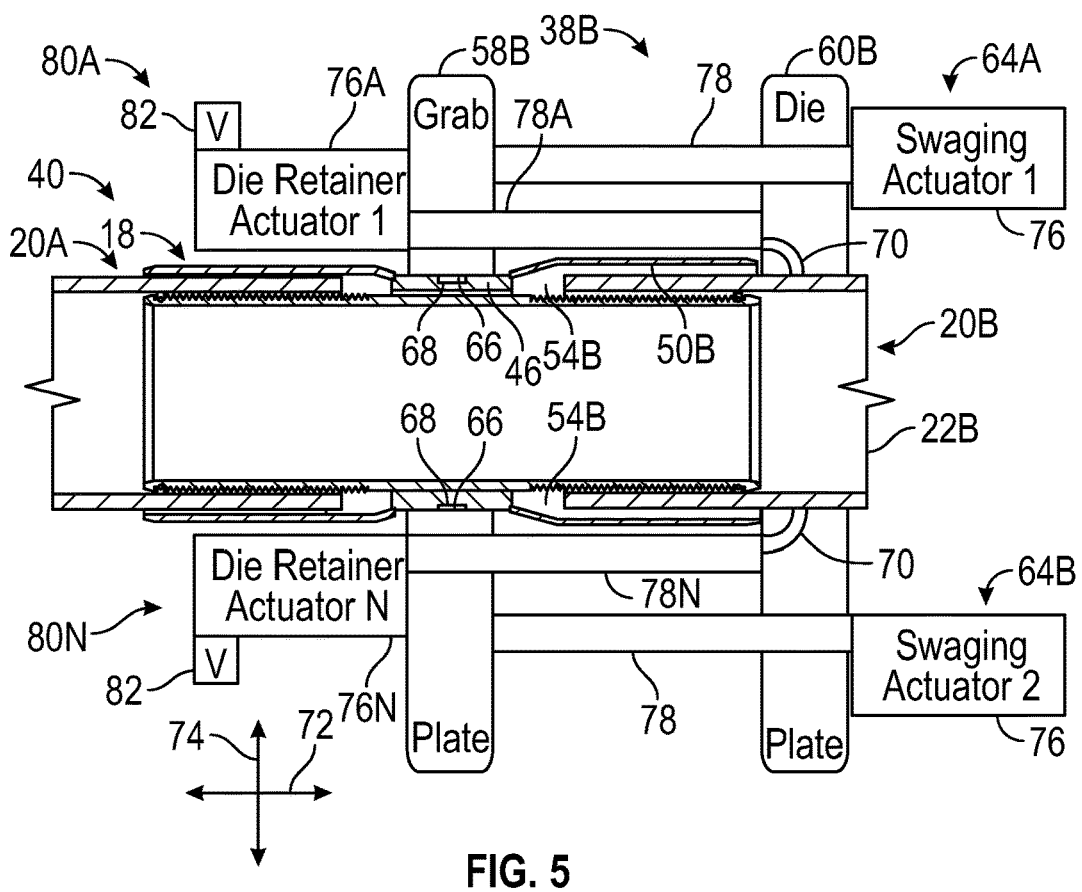
FIG. 5 is an axial cross-section profile of another example of the portion of the pipeline system of FIG. 4 and a swage machine that includes die retainer actuators, in accordance with an embodiment of the present disclosure.

To help illustrate, another example cross-section of a swage machine 38B and a portion 40 of a pipeline system 10 is shown in FIG. 5. As depicted, the portion 40 of the pipeline system 10 includes a first pipe segment 20A, a second pipe segment 20B, and a pipe fitting 18, which is coupled between the first pipe segment 20A and the second pipe segment 20B. In fact, in some embodiments, the portion 40 of the pipeline system 10 in FIG. 5 may generally match the portion of the pipeline system 10 in FIG. 4.

In other words, the pipe fitting 18 in FIG. 5 may be a midline pipe fitting 18. However, it should be appreciated that the depicted example is merely intended to be illustrative and not limiting. In particular, in other embodiments, the techniques described in the present disclosure may additionally or alternatively be used with other types of pipe fittings 18, such as a pipe end fitting 18.

In any case, to facilitate conformally deforming a fitting jacket 50 around pipe segment tubing 22, as depicted, the swage machine 38B includes a grab plate 58B and a die plate 60B. In particular, as depicted, the grab plate 58B includes a grab tab 66, which is implemented (e.g., sized and/or shaped) to matingly interlock (e.g., engage and/or interface) with a grab notch 68 on the grab ring 46 of the pipe fitting 18 to facilitate securing the swage machine 38B to the pipe fitting 18. In fact, in some embodiments, the grab tab 66 of the swage machine 38B in FIG. 5 may generally match the grab tab 66 of the swage machine 38A in FIG. 4

Additionally, as depicted in FIG. 5, the die plate 60B of the swage machine 38B is implemented to enable a set of one or more dies (e.g., die segments) 70 to be loaded therein. In particular, as depicted, the set of one or more dies 70 is loaded in the die plate 60B such that the set of one or more dies 70 opens toward the grab plate 58B of the swage machine 38B. As such, when compressed against a fitting jacket 50 of the pipe fitting 18 in an axial direction 72 toward the grab plate 58B, the shape of the set of one or more dies 70 may compress the fitting jacket 50 inwardly in a radial direction 74, for example, such that the fitting jacket 50 and pipe segment tubing 22 disposed in a corresponding tubing cavity 54 are conformally deformed. In fact, in some embodiments, the set of one or more dies 70 loaded in the swage machine 38B of FIG. 5 may generally match the set of one or more dies 70 loaded in the swage machine 38A of FIG. 4.

To facilitate compressing a set of one or more dies 70 loaded in its die plate 60 against a fitting jacket 50 in an axial direction 72, as in the depicted example, a swage machine 38 may include one or more swaging actuators 64. In particular, in the depicted example, the swage machine 38B include a first swaging actuator 64A and a second swaging actuator 64B. As described above, in some embodiments, one or more swaging actuators 64 of a swage machine 38 may each be a fluid actuator, such as a hydraulic actuator or a pneumatic actuator. In any case, as depicted, each swaging actuator 64 of the swage machine 38B includes an actuator cylinder 76 and an actuator piston 78, which selectively extends out from the actuator cylinder 76 based at least in part on the supply of fluid (e.g., liquid and/or gas) to the actuator cylinder 76 and/or selectively retracts into the actuator cylinder 76 based at least in part on the extraction of fluid from the actuator cylinder 76.

In particular, in the depicted example, the actuator cylinder 76 of each swaging actuator 64 is secured to the die plate 60B of the swage machine 38B. Additionally, in the depicted example, the actuator piston 78 of each swaging actuator 64 extends through the die plate 60B and is secured to the grab plate 58B of the swage machine 38B. As such, to facilitate performing a swaging operation, the swage machine 38B may operate one or more of its swaging actuators 64 to pull the grab plate 58B toward the die 60B via one or more reverse (e.g., retracting) strokes such that the second fitting jacket 50B of the pipe fitting 18 secured to the grab plate 58A moves through the set of one or more dies 70 loaded in the die plate 60A. On the other hand, the swage machine 38B may operate one or more of its swaging actuators 64 to push the grab plate 58B away from the die 60B via one or more forward (e.g., extending) strokes, for example, to facilitate loading a set of one or more dies 70 in the die plate 60B and/or resetting position of the die plate 60B for the performance of a subsequent swaging operation. In fact, in some embodiments, the swaging actuators 64 of the swage machine 38B in FIG. 5 may generally match the swaging actuators 64 of the swage machine 38A in FIG. 4.

However, as depicted in FIG. 5, the swage machine 38B includes die retainer actuators 80 in addition to its swaging actuators 64. In particular, in the depicted example, the swage machine 38B includes a first die retainer actuator 80A and an Nth die retainer actuator 80N. In some embodiments, one or more die retainer actuators 80 of a swage machine 38 may each be a fluid actuator, such as a hydraulic actuator or a pneumatic actuator.

In any case, as depicted, each die retainer actuator 80 of the swage machine 38B includes an actuator cylinder 76 and an actuator piston 78. In particular, the first die retainer actuator 80A includes a first actuator cylinder 76A and a first actuator piston 78A, which selectively extends out from the first actuator cylinder 76A based at least in part on the supply of fluid (e.g., liquid and/or gas) to the first actuator cylinder 76A and/or selectively retracts into the first actuator cylinder 76A based at least in part on the extraction of fluid from the first actuator cylinder 76A. Additionally, the Nth die retainer actuator 80N includes an Nth actuator cylinder 76N and an Nth actuator piston 78N, which selectively extends out from the Nth actuator cylinder 76N based at least in part on the supply of fluid (e.g., liquid and/or gas) to the Nth actuator cylinder 76N and/or selectively retracts into the Nth actuator cylinder 76N based at least in part on the extraction of fluid from the Nth actuator cylinder 76N.

More specifically, as depicted, the actuator cylinder 76 of each die retainer actuator 80 in the swage machine 38B is secured to the grab plate 58B of the swage machine 38B. Additionally, as depicted, the actuator piston 78 of each die retainer actuator 80 extends through the grab plate 58B in an axial direction 72 toward the die plate 60B of the swage machine 38B. By implementing a die retainer actuator 80 in this manner, the swage machine 38B may operate the die retainer actuator 80 such that the actuator piston 78 of the die retainer actuator 80 extends out from the actuator cylinder 76 of the die retainer actuator 80 and engages (e.g., pushes against and/or directly abuts) a die 70 loaded in the die plate 60B, for example, at least in part by enabling fluid to be supplied to the actuator cylinder 76 of the die retainer actuator 80 until a target (e.g., desired) fluid pressure associated with the die retainer actuator 80 is present in the actuator cylinder 76.

As described above, to perform a swaging operation, the swage machine 38B may operate one or more of its swaging actuators 64 to pull its grab plate 58B toward its die plate 60B. Additionally, as described above, the actuator cylinder 76 of a die retainer actuator 80 in the swage machine 38B is secured to the grab plate 58B and the actuator piston 78 of the die retainer actuator 80 extends through the grab plate 58B in an axial direction 72 toward the die plate 60B. Accordingly, performing the swaging operation at least in part by moving the grab plate 58B toward the die plate 60B may force (e.g., push) the actuator piston 78 of the die retainer actuator 80 farther into the actuator cylinder 76 of the die retainer actuator 80, thereby increasing fluid pressure within the actuator cylinder 76 of the die retainer actuator 80.

As such, to facilitate securing a set of one or more dies 70 in the die plate 60B while the swage machine 38B is performing a swaging operation, as depicted, the die retainer actuators 80 each additionally includes a relief (e.g., fluid) valve 82, which is fluidly coupled to its actuator cylinder 76. In particular, in some embodiments, a relief valve 82 of a die retainer actuator 80 may be implemented to retain fluid in the actuator cylinder 76 of the die retainer actuator 80 when fluid pressure within the actuator cylinder 76 is less than or equal to a threshold fluid pressure associated with the relief valve 82. On the other hand, once the fluid pressure within the actuator cylinder 76 exceeds the threshold fluid pressure, the relief valve 82 may begin releasing fluid from the actuator cylinder 76 of the die retainer actuator 80.

Additionally, in some embodiments, the target (e.g., desired) fluid pressure associated with a die retainer actuator 80 of a swage machine 38 may be less than or equal to the threshold fluid pressure associated with the relief valve 82 of the die retainer actuator 80, for example, to enable the target fluid pressure to be reached without having to continuously supply fluid to the die retainer actuator 80. In other words, at least in such embodiments, implementing a die retainer actuator 80 with a relief valve 82 may enable the die retainer actuator 80 to exert at least the force, which results from its target fluid pressure being present in its actuator cylinder 76, in the axial direction 72 against a die 70 loaded in the die plate 60B of the swage machine 38B while the swage machine 38B performs a swaging operation using the die 70, for example, passively without continuously supplying fluid to the die retainer actuator 80 after an associated target fluid pressure is initially reached. In this manner, a swage machine 38 may be implemented to enable the swage machine 38 to be operated such that the swage machine 38 facilitates maintaining a die 70 loaded in the die plate 60 of the swage machine 38 at its target position in the die plate 60 during the performance of a swaging operation, which, at least in some instances, may facilitate improving may facilitate improving quality (e.g., uniformity) of a resulting swage and, thus, security and/or sealing provided by the swage in a pipeline system 10.

However, it should be appreciated that the depicted example is merely intended to be illustrative and not limiting. In particular, in other embodiments, a swage machine 38 may include fewer than two (e.g., one) die retainer swaging actuators 80 or more than two (e.g., three, four, or more) die retainer actuators 64. Additionally or alternatively, a swage machine 38 may include fewer than two (e.g., one) swaging actuators 64 or more than two (e.g., three, four, or more) swaging actuators 64. Moreover, in other embodiments, the swaging actuators 64 of a swage machine 38 may be implemented with a different configuration.

Figure 6:
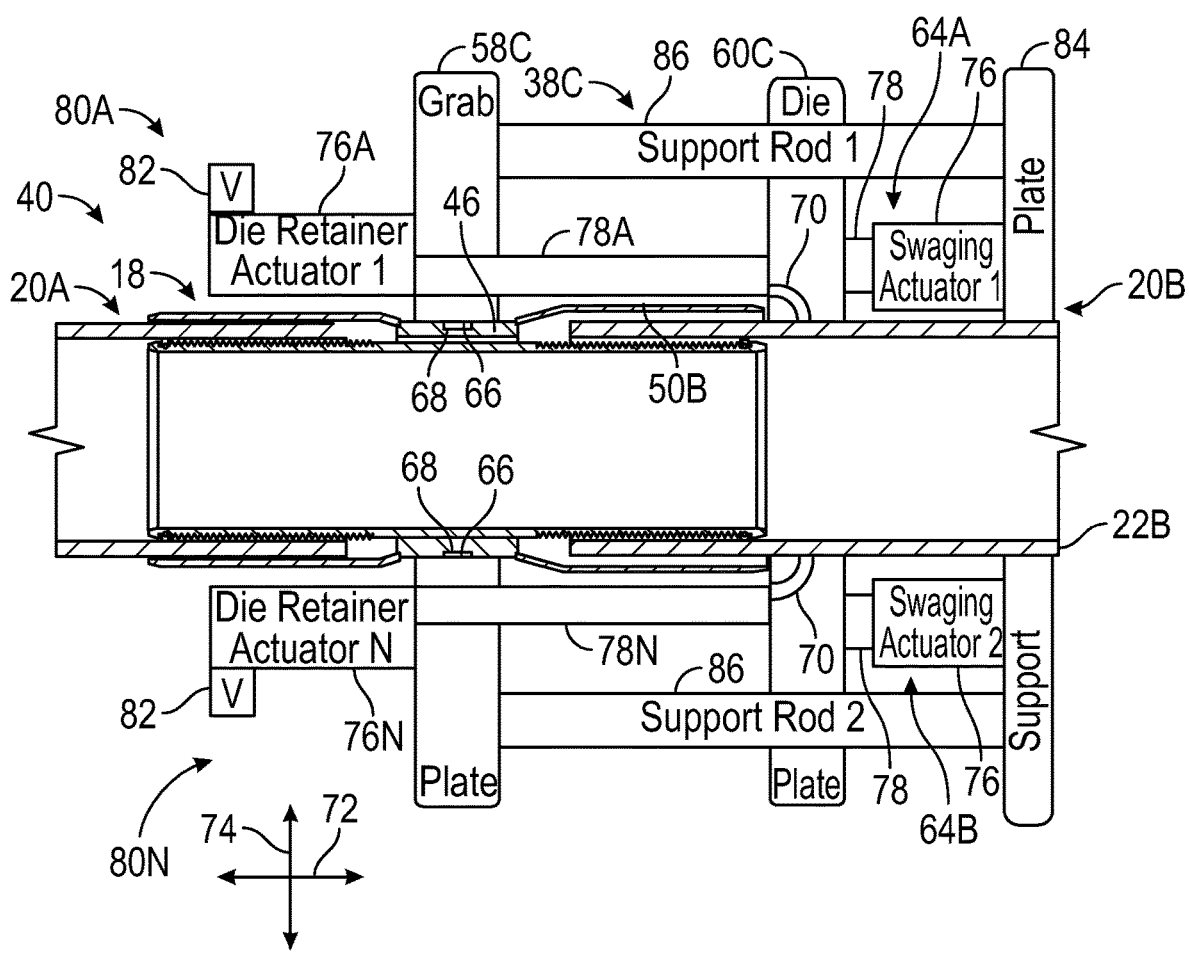
FIG. 6 is an axial cross-section profile of another example of the portion of the pipeline system of FIG. 4 and a swage machine that includes die retainer actuators, in accordance with an embodiment of the present disclosure.

To help illustrate, another example cross-section of a swage machine 38C and a portion 40 of a pipeline system 10 is shown in FIG. 6. As depicted, the portion 40 of the pipeline system 10 includes a first pipe segment 20A, a second pipe segment 20B, and a pipe fitting 18, which is coupled between the first pipe segment 20A and the second pipe segment 20B. In fact, in some embodiments, the portion 40 of the pipeline system 10 in FIG. 6 may generally match the portion 40 of the pipeline system 10 in FIG. 4.

In other words, the pipe fitting 18 in FIG. 6 may be a midline pipe fitting 18. However, it should be appreciated that the depicted example is merely intended to be illustrative and not limiting. In particular, in other embodiments, the techniques described in the present disclosure may additionally or alternatively be used with other types of pipe fittings 18, such as a pipe end fitting 18.

In any case, to facilitate conformally deforming a fitting jacket 50 around pipe segment tubing 22, as depicted, the swage machine 38C includes a support plate 84 in addition to a grab plate 58C and a die plate 60C. In particular, as depicted, the grab plate 58C includes a grab tab 66, which is implemented (e.g., sized and/or shaped) to matingly interlock (e.g., engage and/or interface) with a grab notch 68 on the grab ring 46 of the pipe fitting 18 to facilitate securing the swage machine 38C to the pipe fitting 18. In fact, in some embodiments, the grab tab 66 of the swage machine 38C in FIG. 6 may generally match the grab tab 66 of the swage machine 38A in FIG. 4

Additionally, as depicted in the FIG. 6, the die plate 60C of the swage machine 38C is implemented to enable a set of one or more dies (e.g., die segments) 70 to be loaded therein. In particular, as depicted, the set of one or more dies 70 is loaded in the die plate 60C such that the set of one or more dies 70 opens toward the grab plate 58C of the swage machine 38C. As such, when compressed against a fitting jacket 50 of the pipe fitting 18 in an axial direction 72 toward the grab plate 58C, the shape of the set of one or more dies 70 may compress the fitting jacket 50 inwardly in a radial direction 74, for example, such that the fitting jacket 50 and pipe segment tubing 22 disposed in a corresponding tubing cavity 54 are conformally deformed. In fact, in some embodiments, the set of one or more dies 70 loaded in the swage machine 38C of FIG. 6 may generally match the set of one or more dies 70 loaded in the swage machine 38A of FIG. 4.

To facilitate compressing a set of one or more dies 70 loaded in its die plate 60C against a fitting jacket 50 in an axial direction 72, as depicted, the swage machine 38C additionally includes swaging actuators 64—namely a first swaging actuator 64A and a second swaging actuator 64B—secured to its support plate 84. As described above, in some embodiments, one or more swaging actuators 64 of a swage machine 38 may each be a fluid actuator, such as a hydraulic actuator or a pneumatic actuator. In any case, similar to the swaging actuators 64 in FIG. 5, as depicted in FIG. 6, each swaging actuator 64 of the swage machine 38C includes an actuator cylinder 76 and an actuator piston 78, which selectively extends out from the actuator cylinder 76 based at least in part on the supply of fluid (e.g., liquid and/or gas) to the actuator cylinder 76 and/or selectively retracts into the actuator cylinder 76 based at least in part on the extraction of fluid from the actuator cylinder 76.

However, as depicted in FIG. 6, the actuator cylinder 76 of each swaging actuator 64 is secured to the support plate 84 of the swage machine 38C. Additionally, in the depicted example, the actuator piston 78 of each swaging actuator 64 is secured to the die plate 60C of the swage machine 38C. As such, to facilitate performing a swaging operation, the swage machine 38C may operate one or more of its swaging actuators 64 to push the die plate 60C toward the grab plate 58C via one or more forward (e.g., extending) strokes such that the set of one or more dies 70 loaded in the die plate 60C is moved over the second fitting jacket 50B of the pipe fitting 18 that is secured to the grab plate 58C. On the other hand, the swage machine 38C may operate one or more of its swaging actuators 64 to pull the die plate 60C away from the grab plate 58C via one or more reverse (e.g., retracting) strokes, for example, to facilitate loading a set of one or more dies 70 in the die plate 60C and/or resetting position of the die plate 60C for the performance of a subsequent swaging operation.

Moreover, to enable the die plate 60C to move (e.g., slide) between the grab plate 58C and the support plate 84, as in the depicted example, one or more support rods 86 may be secured between the grab plate 58C and the support plate 84 such that the one or more support rods 86 extend through the die plate 60C. However, it should be appreciated that the depicted example is merely intended to be illustrative and not limiting. In particular, in other embodiments, a swage machine 38 may include less than two (e.g., zero or one) support rods 86 or more than two (e.g., three, four, or more) support rods 86. Furthermore, in other embodiments, a swage machine 38 may include one or more other types of support members, such as a housing of the swage machine 38, in addition to or as an alternative to one or more support rods 86.

In any case, to facilitate securing a die 70 loaded in the die plate 60C at its target (e.g., desired) position in the die plate 60C, as depicted, the swage machine 38C includes die retainer actuators 80 in addition to its swaging actuators 64. In particular, in the depicted example, the swage machine 38C includes a first die retainer actuator 80A and an Nth die retainer actuator 80N. As described above, in some embodiments, one or more die retainer actuators 80 of a swage machine 38 may each be a fluid actuator, such as a hydraulic actuator or a pneumatic actuator.

Additionally, as depicted, each die retainer actuator 80 of the swage machine 38C includes an actuator cylinder 76 and an actuator piston 78. In particular, the first die retainer actuator 80A includes a first actuator cylinder 76A and a first actuator piston 78A, which selectively extends out from the first actuator cylinder 76A based at least in part on the supply of fluid (e.g., liquid and/or gas) to the first actuator cylinder 76A and/or selectively retracts into the first actuator cylinder 76A based at least in part on the extraction of fluid from the first actuator cylinder 76A. Additionally, the Nth die retainer actuator 80N includes an Nth actuator cylinder 76N and an Nth actuator piston 78N, which selectively extends out from the Nth actuator cylinder 76N based at least in part on the supply of fluid (e.g., liquid and/or gas) to the Nth actuator cylinder 76N and/or selectively retracts into the Nth actuator cylinder 76N based at least in part on the extraction of fluid from the Nth actuator cylinder 76N.

In fact, in some embodiments, the configuration of the die retainer actuators 80 in the swage machine 38C of FIG. 6 may generally match the configuration of the die retainer actuators 80 in the swage machine 38B of FIG. 5. In particular, as depicted in FIG. 6, the actuator cylinder 76 of each die retainer actuator 80 is secured to the grab plate 58C of the swage machine 38C. Additionally, as depicted, the actuator piston 78 of each die retainer actuator 80 extends through the grab plate 58C in an axial direction 72 toward the die plate 60C of the swage machine 38C. By implementing a die retainer actuator 80 in this manner, the swage machine 38C may operate the die retainer actuator 80 such that the actuator piston 78 of the die retainer actuator 80 extends out from the actuator cylinder 76 of the die retainer actuator 80 and engages (e.g., pushes against and/or directly abuts) a die 70 loaded in the die plate 60C, for example, at least in part by enabling fluid to be supplied to the actuator cylinder 76 of the die retainer actuator 80 until a target fluid pressure associated with the die retainer actuator 80 is present in the actuator cylinder 76.

As described above, to perform a swaging operation, the swage machine 38C may operate one or more of its swaging actuators 64 to push its die plate 60C toward its grab plate 58C. Additionally, as described above, the actuator cylinder 76 of a die retainer actuator 80 in the swage machine 38C is secured to the grab plate 58C and the actuator piston 78 of the die retainer actuator 80 extends through the grab plate 58C in an axial direction 72 toward the die plate 60C. Accordingly, performing the swaging operation at least in part by moving the die plate 60C toward the grab plate 58C may force the actuator piston 78 of the die retainer actuator 80 farther into the actuator cylinder 76 of the die retainer actuator 80, thereby increasing fluid pressure within the actuator cylinder 76 of the die retainer actuator 80.

As such, to facilitate securing a set of one or more dies 70 in the die plate 60C of the swage machine 38C while the swage machine 38C is performing a swaging operation, as depicted, the die retainer actuators 80 each additionally includes a relief (e.g., fluid) valve 82, which is fluidly coupled to its actuator cylinder 76. As described above, in some embodiments, a relief valve 82 of a die retainer actuator 80 may be implemented to retain fluid in the actuator cylinder 76 of the die retainer actuator 80 when fluid pressure within the actuator cylinder 76 is less than or equal to a threshold fluid pressure associated with the relief valve 82. On the other hand, once the fluid pressure within the actuator cylinder 76 exceeds the threshold fluid pressure, the relief valve 82 may begin releasing fluid from the actuator cylinder 76.

Additionally, as described above, in some embodiments, the target (e.g., desired) fluid pressure associated with a die retainer actuator 80 of a swage machine 38 may be less than or equal to the threshold fluid pressure associated with the relief valve 82 of the die retainer actuator 80, for example, to enable the target fluid pressure to be reached without having to continuously supply fluid to the die retainer actuator 80. In other words, at least in such embodiments, implementing a die retainer actuator 80 with a relief valve 82 may enable the die retainer actuator 80 to exert at least the force, which results from its target fluid pressure being present in its actuator cylinder 76, in the axial direction 72 against a die 70 loaded in the die plate 60C of the swage machine 38C while the swage machine 38C performs a swaging operation using the die 70, for example, passively without continuously supplying fluid to the die retainer actuator 80 after an associated target fluid pressure is initially reached. In this manner, a swage machine 38 may be implemented to enable the swage machine 38 to be operated such that the swage machine 38 facilitates maintaining a die 70 loaded in the die plate 60 of the swage machine 38 at its target position in the die plate 60 during the performance of a swaging operation, which, at least in some instances, may facilitate improving may facilitate improving quality (e.g., uniformity) of a resulting swage and, thus, security and/or sealing provided by the swage in a pipeline system 10.

Figure 7:
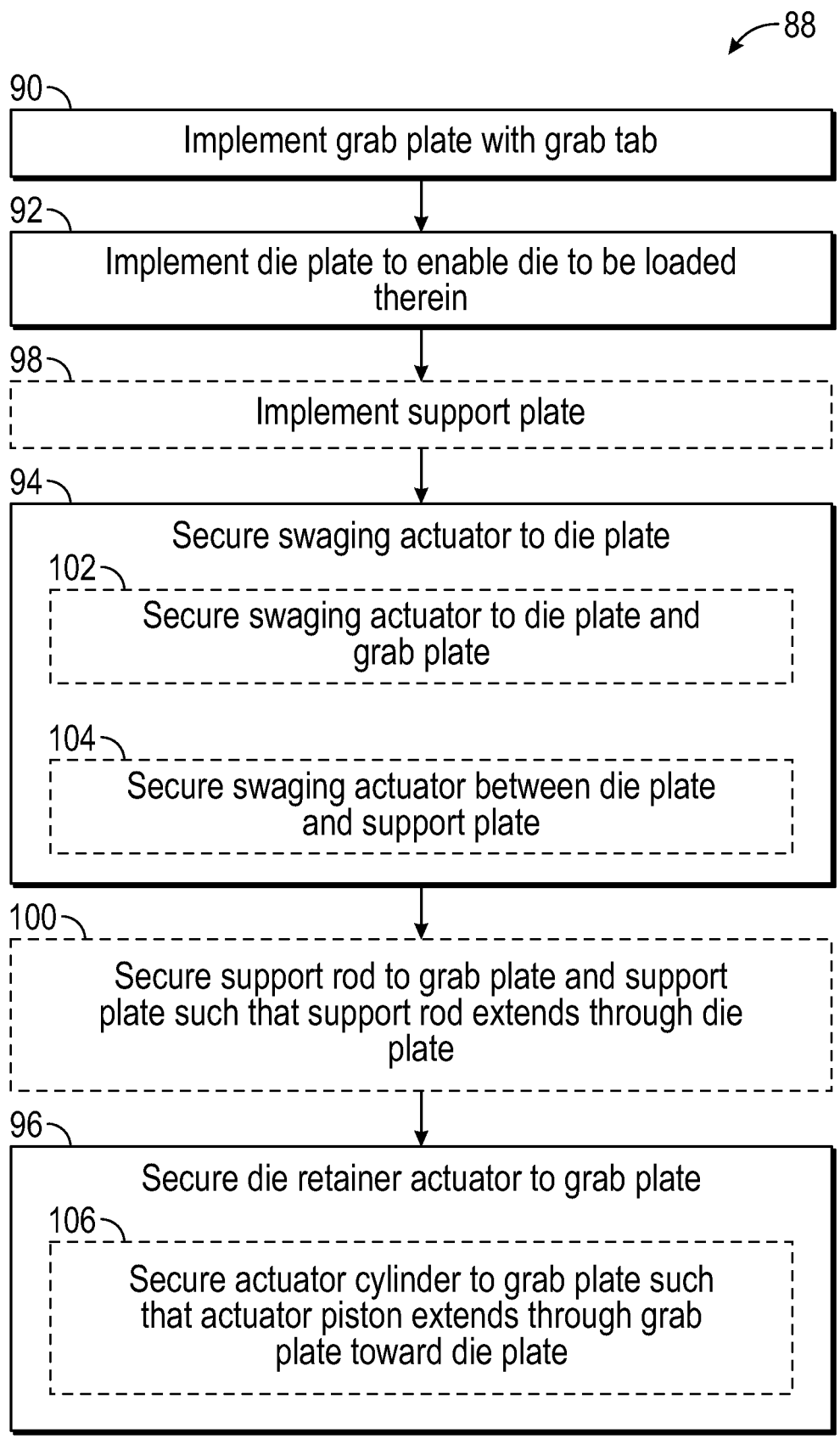
FIG. 7 is a flow diagram of an example process for implementing a swage machine, in accordance with an embodiment of the present disclosure.

To help further illustrate, an example of a process 88 for implementing a swage machine 38 is described in FIG. 7. Generally, the process 88 includes implementing a grab plate with a grab tab (process block 90) and implementing a die plate to enable a die to be loaded therein (process block 92). Additionally, the process 88 generally includes securing a swaging actuator to the die plate (process block 94) and securing a die retainer actuator to the grab plate (process block 96).

Although described in a specific order, which corresponds with an embodiment of the present disclosure, it should be appreciated that the example process 88 is merely intended to be illustrative and non-limiting. In particular, in other embodiments, a process 88 for implementing a swage machine 38 may include one or more additional process blocks and/or omit one or more of the depicted process blocks. For example, some embodiments of the process 88 may additionally include implementing a support plate (process block 98) while other embodiments of the process 88 do not. Furthermore, some embodiments of the process 88 may additionally include securing a support rod to the grab plate and the support plate such that the support rod extends through the die plate (process block 100) while other embodiments of the process 88 do not. Additionally or alternatively, in other embodiments, one or more of the depicted process blocks may be performed in a different order, for example, such that the die plate 60 is implemented before the grab plate 58.

In any case, as described above, a swage machine 38 may include a grab plate 58 with a grab tab 66, which is implemented (e.g., shaped and/or sized) to matingly interlock with a grab notch 68 on the grab ring 46 of a pipe fitting 18 that is to be swaged by the swage machine 38. As such, implementing the swage machine 38 may include implementing a grab plate 58 with a grab tab 66 (process block 90). In some embodiments, the grab plate 58 of the swage machine 38 may be implemented at least in part using metal, such as carbon steel, stainless steel, duplex stainless steel, and/or super duplex stainless steel.

Additionally, as described above, a swage machine 38 may include a die plate 60, which is implemented to enable a set of one or more dies 70 to be loaded (e.g., installed) therein. As such, implementing the swage machine 38 may include implementing a die plate 60 to enable a set of one or more dies 70 to be loaded into the die plate 60, for example, such that the set of one or more dies 70 opens toward the grab plate 58 of the swage machine 38 (process block 92). In some embodiments, the die plate 60 of the swage machine 38 may be implemented at least in part using metal, such as carbon steel, stainless steel, duplex stainless steel, and/or super duplex stainless steel.

Furthermore, as described above, a swage machine 38 may include one or more swaging actuators 64 secured to its die plate 60. As such, implementing the swage machine 38 may include securing one or more swaging actuators 64 to the die plate 60 of the swage machine 38 (process block 94). In particular, as depicted in FIG. 5, in some embodiments, a swaging actuator 64 of a swage machine 38 may be secured to the die plate 60 of the swage machine 38 as well as the grab plate 58 of the swage machine 38. In other words, in such embodiments, securing the swaging actuator 64 in the swage machine 38 may include securing the swaging actuator 64 to the die plate 60 as well as the grab plate 58 of the swage machine 38 (process block 102). In particular, in some such embodiments, the actuator cylinder 76 of the swaging actuator 64 may be secured to the die plate 60 and the actuator piston 78 of the swaging actuator 64 may extend through the die plate 60 and be secured to the grab plate 58 or vice versa, for example, to enable the swage machine 38 to perform a swaging operation at least in part by operating the swaging actuator 64 to pull the grab plate 58 toward the die plate 60.

However, as depicted in FIG. 6, in other embodiments, a swaging actuator 64 of a swage machine 38 may be secured between the die plate 60 and a support plate 84 of the swage machine 38. In other words, in such embodiments, implementing the swage machine 38 may include implementing a support plate 84, for example, at least in part using metal, such as carbon steel, stainless steel, duplex stainless steel, and/or super duplex stainless steel (process block 98). Additionally, in such embodiments, securing the swaging actuator 64 in the swage machine 38 may include securing the swaging actuator 64 between the die plate 60 and the support plate 84 of the swage machine 38 (process block 104). In particular, in some such embodiments, the actuator cylinder 76 of the swaging actuator 64 may be secured to the support plate 84 and the actuator piston 78 of the swaging actuator 64 may be secured to the die plate 60 or vice versa, for example, to enable the swage machine 38 to perform a swaging operation at least in part by operating the swaging actuator 64 to push the die plate 60 toward the grab plate 58.

Moreover, as depicted in FIG. 6, in some embodiments, a swage machine 38 may additionally include one or more support rods 86 secured to its grab plate 58 and its support plate 84 such that the one or more support rods 86 extend through its die plate 60. In other words, in such embodiments, implementing the swage machine 38 may include securing one or more support rods 86 to the grab plate 58 and the support plate 84 of the swage machine 38 such that the one or more support rods 86 extend through the die plate 60 of the swage machine 38, for example, to enable the die plate 60 to slide in an axial direction 72 between the grab plate 58 and the support plate 84 (process block 100). In particular, in some such embodiments, one or more support rods 86 of the swage machine 38 may be implemented at least in part using metal, such as carbon steel, stainless steel, duplex stainless steel, and/or super duplex stainless steel.

In any case, as described above, a swage machine 38 may additionally include one or more die retainer actuators 80 secured to its grab plate 58. As such, implementing the swage machine 38 may include securing one or more die retainer actuators 80 to the grab plate 58 of the swage machine 38 (process block 96). In particular, as described above, in some embodiments, a die retainer actuator 80 may be secured in a swage machine 38 such that its actuator cylinder 76 is secured to the grab plate 58 of the swage machine 38 and its actuator piston 78 extends through the grab plate 58 toward the die plate 60 of the swage machine 38, for example, to enable the actuator piston 78 to engage (e.g., contact and/or directly abut) a die 70 loaded in the die plate 60 and, thus, facilitate securing the die 70 at its target position in the die plate 60. In other words, in such embodiments, securing a die retainer actuator 80 in the swage machine 38 may include securing the actuator cylinder 76 of the die retainer actuator 80 to the grab plate 58 of the swage machine 38 such that the actuator piston 78 of the die retainer actuator 80 extends through the grab plate 58 toward the swage machine 38 in an axial direction 72 (process block 106). In this manner, the present disclosure provides techniques for implementing a swage machine 38 that may be operated to facilitate securing one or more dies 70 at corresponding target (e.g., desired) positions in its die plate 60.

Figure 8:
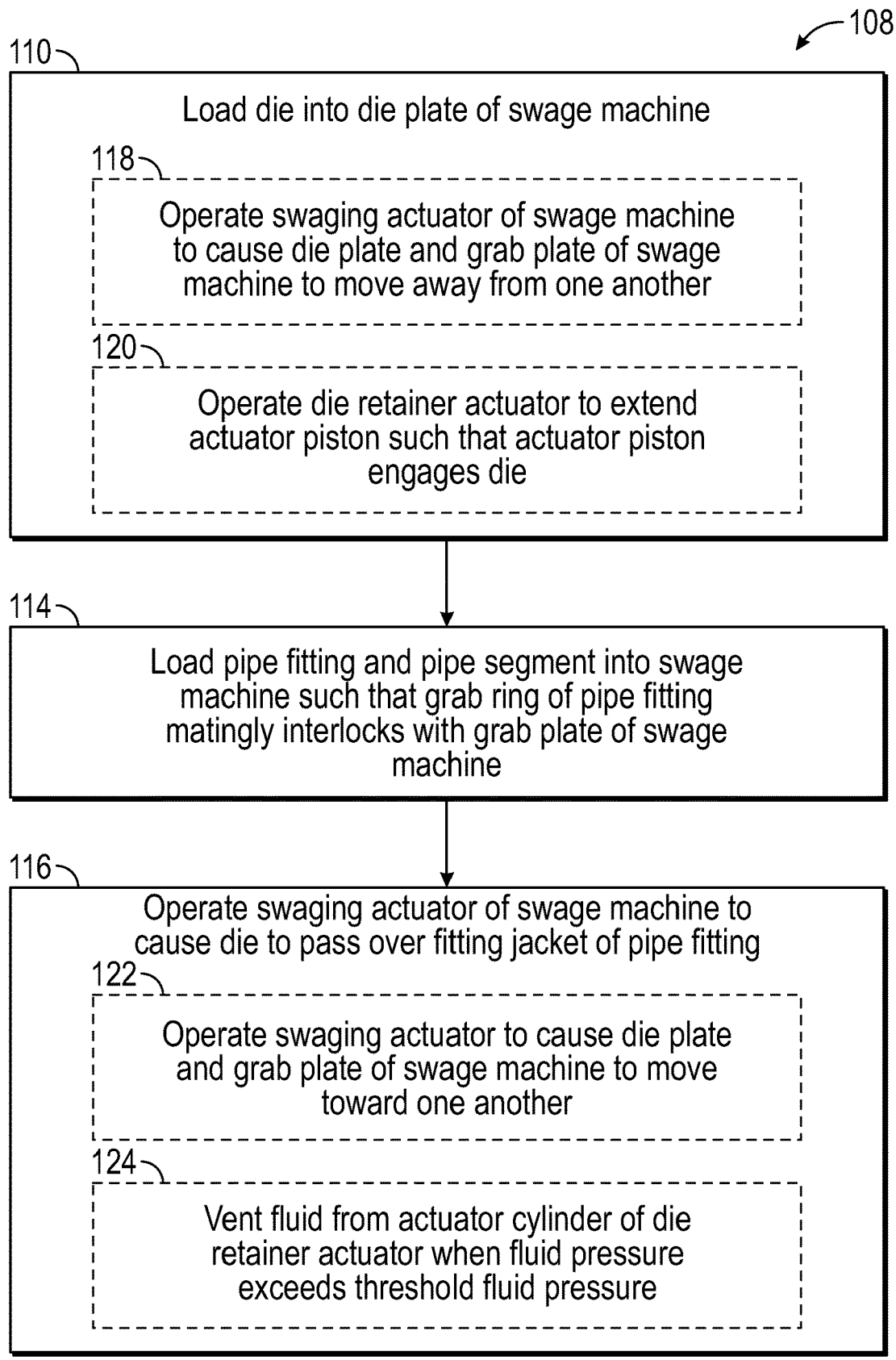
FIG. 8 is a flow diagram of an example process for operating a swage machine, in accordance with an embodiment of the present disclosure.

To help further illustrate, an example of a process 108 for operating a swage machine 38 is described in FIG. 8. Generally, the process 108 includes loading a die into a die plate of a swage machine (process block 110) and loading a pipe fitting and a pipe segment into the swage machine such that a grab ring of the pipe fitting matingly interlocks with a grab plate of the swage machine (process block 114). Additionally, the process 108 generally includes operating a swaging actuator of the swage machine to cause the die to pass over a fitting jacket of the pipe fitting (process block 116).

Although described in a specific order, which corresponds with an embodiment of the present disclosure, it should be appreciated that the example process 108 is merely intended to be illustrative and non-limiting. In particular, in other embodiments, a process 108 for operating a swage machine 38 may include one or more additional process blocks and/or omit one or more of the depicted process blocks. Additionally or alternatively, in other embodiments, one or more of the depicted process blocks may be performed in a different order, for example, such that the pipe fitting 18 and the pipe segment 20 are loaded into the swage machine 38 before the die 70 is loaded into the die plate 60 of the swage machine 38.

In any case, as described above, a die plate 60 of a swage machine 38 may be implemented to enable a set of one or more dies (e.g., die segments) 70, which is to be used to swage (e.g., conformally deform) a fitting jacket 50 of a pipe fitting 18 that is secured to the grab plate 58 of the swage machine 38 around pipe segment tubing 22 that is disposed in the pipe fitting 18, to be loaded therein. As such, operating the swage machine 38 to perform a swaging operation may include loading a set of one or more dies 70 into the die plate 60 of the swage machine 38 (process block 110). In particular, as described above, the set of one or more dies 70 may be loaded into the die plate 60 such that the set of one or more dies 70 opens toward the grab plate 58 of the swage machine 38, thereby enabling the swage machine 38 to perform a swaging operation at least in part by operating one or more of its swaging actuators 64 to cause its die plate 60 and its grab plate 58 to move toward one another.

As such, to facilitate loading a die 70, which is to be used during a subsequent swaging operation, into the die plate 60 of a swage machine 38, in some embodiments, one or more swaging actuators 64 of the swage machine 38 may be operated to cause the die plate 60 and the grab plate 58 of the swage machine 38 to move away from one another, for example, to facilitate providing more room (e.g., space) for an operator to access the die plate 60 and/or resetting the position of the die plate 60 for the performance of the subsequent swaging operation (process block 118). In particular, as described above with regard to FIG. 5, in some such embodiments, the swage machine 38 may cause its die plate 60 and its grab plate 58 to move away from one another at least in part by operating a swaging actuator 64 of the swage machine 38 to push the grab plate 58 away from the die plate 60, for example, at least in part by enabling fluid to be supplied to the actuator cylinder 76 of the swaging actuator 64 such that the actuator piston 78 of the swaging actuator 64 extends out farther from the actuator cylinder 76.

However, as described above with regard to FIG. 6, in other such embodiments, the swage machine 38 may cause its die plate and its grab plate 58 to move away from one another at least in part by operating a swaging actuator 64 of the swage machine 38 to pull the die plate 60 away from the grab plate 58, for example, at least in part by enable fluid to be extracted from the actuator cylinder of the swaging actuator 64 such that the actuator piston 78 of the swaging actuator 64 retracts farther into the actuator cylinder 76.

In any case, to facilitate securing a die 70 at its target (e.g., desired) position in the die plate 60, as described above, a swage machine 38 may include one or more die retainer actuators 80. In particular, as described above, in some embodiments, a die retainer actuator 80 may be secured in a swage machine 38 such that its actuator cylinder 76 is secured to the grab plate 58 of the swage machine 38 and its actuator piston 78 extends through the grab plate 58 in an axial direction 72 toward the die plate 60 of the swage machine 38. Thus, in such embodiments, the swage machine 38 may operate the die retainer actuator 80 such that its actuator piston 78 extends out from its actuator cylinder 78 and engages (e.g., pushes against and/or directly abuts) a corresponding die 70 loaded in the die plate 60, thereby enabling the die retainer actuator 80 to exert force on the die 70 in an axial direction 72, which, at least in some instances, may facilitate securing the die 70 at its target position in the die plate 60.

Additionally, as described above, a swage machine 38 may include a grab plate 58 with a grab tab 66, which is implemented (e.g., sized and/or shaped) to matingly interlock with a grab notch 68 on a grab ring 46 of a pipe fitting 18 to be swaged by the swage machine 38. Furthermore, as described above, a pipe fitting 18 may be secured to a pipe segment 20 at least in part by operating a swage machine 38 to conformally deform a fitting jacket 50 of the pipe fitting 18 around the tubing 22 of the pipe segment 20. As such, operating the swage machine 38 may include loading a pipe fitting 18 and a pipe segment 20 to be secured thereto into the swage machine 38 such that the grab notch 68 on the grab ring 46 of the pipe fitting 18 matingly interlocks with the grab tab 66 on the grab plate 58 of the swage machine 38 (process block 114).

Moreover, as described above, a swage machine 38 may then perform a swaging operation at least in part by operating one or more of its swaging actuators 64 to cause a set of one or more dies 70 loaded in the swage machine 38 to pass over a fitting jacket 50 of a pipe fitting 18 that is secured to the swage machine 38 (process block 116). In particular, as described above, in some embodiments, a set of one or more dies 70 may be loaded in the die plate 60 of a swage machine 38 and the swage machine 38 may be secured to a pipe fitting 18 via its grab plate 58. Thus, in such embodiments, operating the swage machine 38 to cause the die 70 to move over the fitting jacket 50 of the pipe fitting 18 may include operating one or more of its swaging actuators 64 to cause its die plate 60 and its grab plate 58 to move toward one another (process block 122). In particular, as described above with regard to FIG. 5, in some such embodiments, the swage machine 38 may cause its die plate 60 and its grab plate 58 to move toward one another at least in part by operating a swaging actuator 64 of the swage machine 38 to pull the grab plate 58 toward the die plate 60, for example, at least in part by enabling fluid to be extracted out from the actuator cylinder 76 of the swaging actuator 64 such that the actuator piston 78 of the swaging actuator 64 retracts farther into the actuator cylinder 76. However, as described above with regard to FIG. 6, in other such embodiments, the swage machine 38 may cause its die plate and its grab plate 58 to move toward one another at least in part by operating a swaging actuator 64 of the swage machine 38 to push the die plate 60 toward the grab plate 58, for example, at least in part by enabling fluid to be supplied to the actuator cylinder of the swaging actuator 64 such that the actuator piston 78 of the swaging actuator 64 extends out farther from the actuator cylinder 76.

In any case, to facilitate securing a die 70 at its target (e.g., desired) position in the die plate 60 of a swage machine 38, as described above, the actuator cylinder 76 of a die retainer actuator 80 may be secured to the grab plate 58 of the swage machine 38 and the actuator piston 78 of the die retainer actuator 80 may be extend through the grab plate 58 in an axial direction 72 toward the die plate 60 to enable the actuator piston 78 to engage (e.g., pushes against and/or directly abut) the die 70. As such, to enable its die plate 60 and its grab plate 58 to move toward one another while securing a die 70 loaded in the die plate 60 at its target position, as described above, each die retainer actuator 80 in the swage machine 38 may include a relief (e.g., fluid) valve 82 that is fluidly coupled to its actuator cylinder 76. As described above, in some embodiments, a relief valve 82 of a die retainer actuator 80 may be implemented to retain fluid in the actuator cylinder 76 of the die retainer actuator 80 when the fluid pressure present within the actuator cylinder 76 is less than or equal to an associated threshold fluid pressure, but begin releasing fluid from the actuator cylinder 76 once the fluid pressure present within the actuator cylinder 76 exceeds the associated threshold fluid pressure. In other words, to enable the die plate 60 and the grab plate 58 to move toward one another while securing the die 70 at its target position in the die plate 60, in such embodiments, the relief valve 82 of the die retainer actuator 80 may vent (e.g., release) fluid from the actuator cylinder 76 of the die retainer actuator 80 when the fluid pressure present within the actuator cylinder 76 exceeds the threshold fluid pressure associated with the relief valve 82 (process block 124).

Moreover, as described above, in some embodiments, the actuator piston 78 of a die retainer actuator 80 may extend out from the actuator cylinder 76 of the die retainer actuator 80 and engage (e.g., push against and/or directly abut) a corresponding die 70 at least in part by enabling fluid to be supplied to the actuator cylinder 76 until a target (e.g., desired) fluid pressure associated with the die retainer actuator 80 is reached (process block 120). In particular, as described above, the target fluid pressure associated with a die retainer actuator 80 may generally be less than or equal to the threshold fluid pressure associated with the relief valve 82 of the die retainer actuator 80, for example, to enable the target fluid pressure to be reached without having to continuously supply fluid to the die retainer actuator 80. Thus, in such embodiments, the die retainer actuator 80 may be used to exert at least the force, which results from the target fluid pressure being present in its actuator cylinder 76, in an axial direction 72 against a die 70 loaded in the die plate 60 of the swage machine 38, for example, passively without continuously supplying fluid to the die retainer actuator 80 after an associated target fluid pressure is initially reached. In this manner, the present disclosure provides techniques for implementing and/or operating special-purpose deployment equipment—namely a swage machine—such that it facilitates maintaining a die loaded in the die plate of the swage machine at its target position in the die plate, which, at least in some instances, may facilitate improving may facilitate improving quality of a resulting swage and, thus, security and/or sealing provided by the swage in a pipeline system.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system comprising:
a pipe fitting configured to be secured to a pipe segment, wherein the pipe fitting comprises a fitting jacket configured to be conformally deformed around tubing of the pipe segment to facilitate securing the pipe fitting to the pipe segment, wherein the tubing of the pipe segment defines a pipe bore and a fluid conduit within a tubing annulus of the tubing; and
a swage machine, wherein the swage machine comprises:
a grab plate configured to matingly interlock with the pipe fitting to facilitate securing the swage machine to the pipe fitting;
a die plate, wherein a set of one or more dies is configured to be loaded in the die plate of the swage machine;
a swaging actuator secured to the die plate of the swage machine, wherein the swaging actuator is configured to facilitate conformally deforming the fitting jacket of the pipe fitting around the tubing of the pipe segment at least in part by causing the die plate and the grab plate of the swage machine to move toward one another; and
a die retainer actuator secured to the grab plate of the swage machine, wherein the die retainer actuator is configured to extend through the grab plate toward the die plate and push directly against a die of the set of one or more dies loaded in the die plate to facilitate securing the die at a target position in the die plate.

2. The system of claim 1, wherein:
the pipe fitting comprises a grab ring having a grab notch; and
the grab plate of the swage machine comprises a grab tab configured to matingly interlocked with the grab notch on the grab ring of the pipe fitting to facilitate securing the swage machine to the pipe fitting.

3. The system of claim 1, wherein the die retainer actuator of the swage machine comprises:
an actuator cylinder secured to the grab plate of the swage machine;
an actuator piston that extends through the grab plate toward the die plate of the swage machine, wherein the actuator piston of the die retainer actuator is configured to extend out from the actuator cylinder of the die retainer actuator and push against the die loaded in the die plate to facilitate securing the die at the target position in the die plate; and
a relief valve fluidly coupled to the actuator cylinder of the die retainer actuator, wherein the relief valve is configured to:
retain fluid in the actuator cylinder of the die retainer actuator when fluid pressure within the actuator cylinder is less than or equal to a threshold fluid pressure; and
vent fluid from the actuator cylinder of the die retainer actuator when the fluid pressure within the actuator cylinder is greater than the threshold fluid pressure.

4. The system of claim 3, wherein:
the actuator piston of the die retainer actuator is configured to retract into the actuator cylinder of the die retainer actuator when the grab plate and the die plate of the swage machine are moved toward one another; and
the relief value is configured to vent fluid out from the actuator cylinder of the die retainer actuator when retraction of the actuator piston into the actuator cylinder results in the fluid pressure within the actuator cylinder being greater than the threshold fluid pressure.

5. The system of claim 3, wherein the swaging actuator of the swage machine comprises:
another actuator cylinder secured to the die plate of the swage machine; and
another actuator piston that extends through the die plate and is secured to the grab plate of the swage machine, wherein the swaging actuator is configured to facilitate conformally deforming the fitting jacket of the pipe fitting around the tubing of the pipe segment at least in part by pulling the grab plate of the swage machine toward the die plate of the swage machine via one or more retracting strokes.

6. The system of claim 3, wherein:
the swage machine comprises a support plate, wherein the die plate of the swage machine is disposed between the support plate and the grab plate of the swage machine; and
the swaging actuator of the swage machine comprises another actuator cylinder secured to the support plate of the swage machine and another actuator piston secured to the die plate of the swage machine, wherein the swaging actuator is configured to facilitate conformally deforming the fitting jacket of the pipe fitting around the tubing of the pipe segment at least in part by pushing the die plate of the swage machine toward the grab plate of the swage machine via one or more extending strokes.

7. The system of claim 6, wherein the swage machine comprises a support rod secured to the support plate and the grab plate of the swage machine such that the support rod extends through the die plate of the swage machine to enable the die plate to slide between the support plate and the grab plate.

8. The system of claim 1, wherein the die retainer actuator of the swage machine comprises a hydraulic actuator or a pneumatic actuator.

9. The system of claim 1, wherein the swage machine comprises another die retainer actuator secured to the grab plate of the swage machine, wherein the other die retainer actuator is configured to extend through the grab plate toward the die plate and push directly against another die of the set of one or more dies loaded in the die plate to facilitate securing the other die at another target position in the die plate.

* * * * *